Feb. 6, 1934. F. J. PALOMBO ET AL 1,945,978
POTATO PEELING MACHINE
Filed Oct. 3, 1931
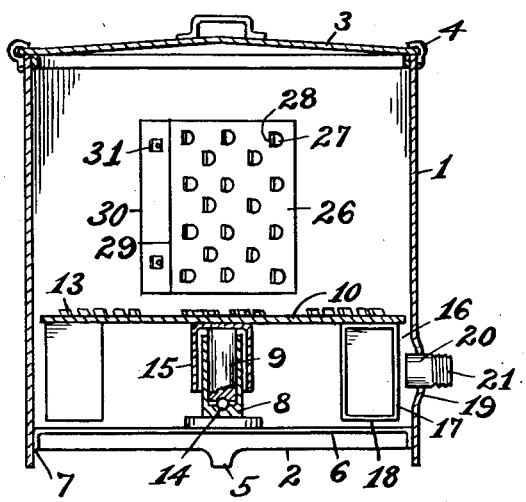
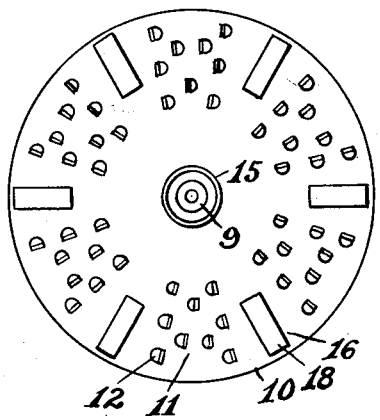
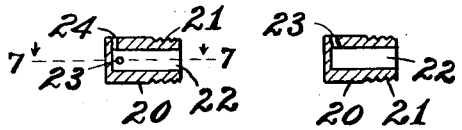
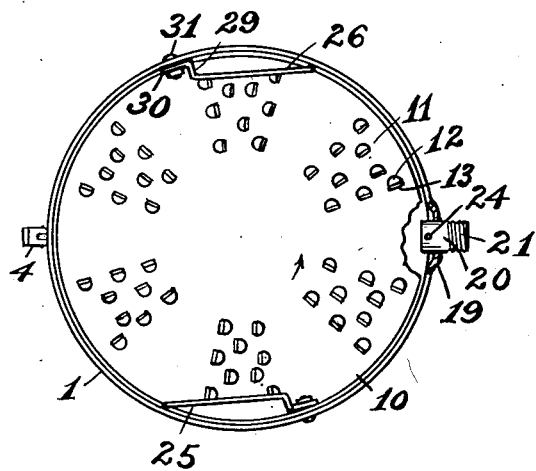
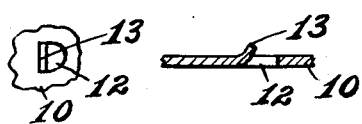
Inventor
F. J. PALOMBO
F. J. PALOMBO, JR.
By G. E. Dunstan,
their Attorney Patented Feb. 6, 1934

1,945,978

UNITED STATES PATENT OFFICE 1,945,978

POTATO PEELING MACHINE

Faustino J. Palombo and Faustino J. Palombo, Jr., Garfield Heights, Ohio

Application October 3, 1931. Serial No. 566,694

2 Claims. (Cl. 146—49)

This invention relates to potato peeling machines and has for its principal object to provide a potato peeling machine, which is operated by water pressure and will quickly and efficiently remove the peeling and at the same time wash the potatoes.

Another object of the invention is to provide a potato peeling machine of said character which is simple in construction, easy to clean and will operate efficiently with a minimum of water pressure.

With the above and other objects in view, the invention will be hereinafter fully described as illustrated in the accompanying drawing, and the novel features thereof will be distinctly pointed out in the appended claims.

In the drawing similar characters of reference are used to indicate corresponding parts.

Figure 1 is a cross sectional view of a potato peeling machine constructed in accordance with our invention, Fig. 2 is a plan view of Fig. 1 the cover having been removed and certain parts being broken away to better show the construction, Fig. 3 is a bottom plan view of the cutter plate, Fig. 4 illustrates in plan view and Fig. 5 in cross section, a cutter tooth, Fig. 6 is a longitudinal sectional view of the nozzle member, and Fig. 7 is a similar view taken on line 7—7 of Fig. 6.

Referring to the drawing, 1 represents a cylindrical receptacle having an open bottom 2 and a removable cover 3. Suitable means as the clamp hooks 4 are adapted to hold the cover in place. Feet indicated by 5 support the receptacle 1. A bar 6 extends across the bottom of the receptacle 1 and is fixed as at 7 to the sides thereof for supporting a central socket member 8. Rotatably mounted in the socket member 8 is a vertical post 9, which supports a circular horizontal cutter plate 10 having areas 11 of openings 12, and one side of said openings is on a radius line and bent upwardly on an angle for serving as a cutting edge 13. A ball bearing 14 is preferably provided at the bottom of the socket of the member 8 for the resting thereon of the post 9. An inverted cup guard 15 encloses the upper end of the socket member 8. The cutter plate 10 and the cup guard 15 may be fixed to the post 9 in any suitable manner. Depending from and fixed to the cutter plate 10 are a plurality of rectangular box-like blades 16 having sides 17 and lower ends 18 extending rearwardly relative to the direction of rotation of said cutter plate. The side of the receptacle 1 is pressed outwardly at 19, and a nozzle member 20 projects therethrough and is fixed therein for attachment of a hose at 21 adapted to be connected to the kitchen faucet. The nozzle member 20 is hollow at 22, and leading therefrom is a lateral opening 23 arranged on an angle for directing the water within and against the rear sides of the box-like blades 16 for causing rotation of the cutter plate 10. A vertical opening 21 is provided at the inner end of the nozzle member 20 for directing water upwardly and into the receptacle 1 for cleaning the potatoes and washing away the particles of peelings removed therefrom.

A pair of vertical cutter members 25 and 26 are arranged at the inner sides of the receptacle 1, and said members are provided with openings 27 and vertical cutting edges 28 similar to the openings 12 and the cutting edges 13 of the cutter plate 10. The cutter members 25 and 26 are inclined inwardly to provide spaces back of same and the sides of the receptacle, and also to restrict the space between said cutter members through which the potatoes will pass. The forward vertical edges of said cutter members are bent outwardly at 29 and then forwardly providing flanges at 30. Bolts, indicated by 31, pass through the flanges 30 of the cutter members 25 and 26 and the sides of the receptacle for removably securing said members in position.

In practice, the receptacle 1 is supported by its feet 5 within the kitchen sink, and a hose leading from the faucet is connected to the nozzle member 20. The potatoes to be peeled are placed within the receptacle upon the cutter plate 10, the cover 3 replaced, and the faucet turned on. The force of the water from the opening 33 of the nozzle 20 will strike the rear sides of the blades 16, thereby causing rotation of the cutter plate 20. The potatoes upon the cutter plate 20 will be carried forward but due to their weight and also the restricted space between the cutter members 25 and 26, the potatoes will lag behind the rotary movement of said cutter plate, and as a result thereof, the peeling of the potatoes will be removed, as they tumble about, both by the cutting edges 13 of said cutter plate and the cutting edges 28 of said cutter members. The water spurting from the vertical opening 23 of the nozzle member 20 will clean the potatoes and also wash away the removed particles of peeling through the cutter openings 12 and 27 and out of the open bottom 2 of the receptacle into the kitchen sink and down the drain.

Having fully described our invention, what we claim is:

1. In a potato peeling machine, the combination of a receptacle, a cutter plate, the cutter plate being rotatably supported within the receptacle, blades depending from the cutter plate, a nozzle member extending into said receptacle below said cutter plate, the nozzle member being adapted to be connected to water pressure, and the nozzle member having a horizontal opening for directing the water against said blades and a vertical opening for directing water above said cutter plate and within said receptacle.

2. In a potato peeling machine, the combination of a receptacle, a cross-bar fixed in the receptacle, a socket member supported by the cross-bar, a cutter plate, a vertical post rotatably mounted in said socket member, an inverted cup guard adapted to enclose said post, the cutter plate being fixed to the bottom cup guard and said cup guard to the top of said post, blades depending from said cutter plate, and means for directing water against said blades.

FAUSTINO J. PALOMBO.
FAUSTINO J. PALOMBO, Jr.